US008901238B2

(12) United States Patent
Tang et al.

(10) Patent No.: US 8,901,238 B2
(45) Date of Patent: *Dec. 2, 2014

(54) SPONGE POLYMER WITH CONTROLLED LONG CHAIN BRANCHING AND BROAD MOLECULAR WEIGHT DISTRIBUTION

(71) Applicant: Lion Copolymer, LLC, Baton Rouge, LA (US)

(72) Inventors: Solomon H. K. Tang, Baton Rouge, LA (US); Willie Charles Burton, Baton Rouge, LA (US); Garrett Doucet, Baton Rouge, LA (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,075

(22) Filed: Oct. 8, 2013

(65) Prior Publication Data

US 2014/0100326 A1    Apr. 10, 2014

Related U.S. Application Data

(60) Provisional application No. 61/711,596, filed on Oct. 9, 2012.

(51) Int. Cl.
| | | |
|---|---|---|
| *C08L 23/16* | (2006.01) | |
| *C08F 236/20* | (2006.01) | |
| *C08F 2/06* | (2006.01) | |
| *C08F 2/14* | (2006.01) | |
| *C08F 2/34* | (2006.01) | |
| *C08F 2/38* | (2006.01) | |
| *C08F 210/06* | (2006.01) | |
| *C08L 23/14* | (2006.01) | |
| *C08F 210/18* | (2006.01) | |
| *C08F 4/642* | (2006.01) | |
| *C08F 4/68* | (2006.01) | |

(52) U.S. Cl.
CPC .............. *C08F 236/20* (2013.01); *C08F 210/06* (2013.01); *C08L 23/145* (2013.01); *C08F 210/18* (2013.01); *Y10S 526/905* (2013.01)

USPC .......... 524/557; 526/88; 526/143; 526/169.2; 526/282; 526/905

(58) Field of Classification Search
CPC ........ C08F 2/06; C08F 4/6093; C08F 210/08; C08F 2500/09
USPC .................. 526/143, 169.2, 282, 905, 73, 88; 524/554
See application file for complete search history.

(56) References Cited

U.S. PATENT DOCUMENTS

| | | | |
|---|---|---|---|
| 3,838,137 A * | 9/1974 | Tang .............................. | 526/144 |
| 3,856,765 A | 12/1974 | Collette et al. | |
| 3,903,062 A | 9/1975 | Arrighetti et al. | |
| 4,156,767 A * | 5/1979 | Hall .............................. | 526/282 |
| 5,473,017 A | 12/1995 | Wang | |
| 5,621,044 A | 4/1997 | Wang | |
| 5,786,504 A | 7/1998 | Nudenberg et al. | |
| 6,300,451 B1 | 10/2001 | Mehta et al. | |
| 6,384,162 B1 | 5/2002 | Zahalka et al. | |
| 2004/0122190 A1 | 6/2004 | Cady et al. | |
| 2014/0100325 A1* | 4/2014 | Burton et al. .................. | 524/554 |

FOREIGN PATENT DOCUMENTS

CA          980497      * 12/1975

OTHER PUBLICATIONS

Skinner et al, Cis-trans isomerism in Ziegler-catalysed terpolymerization of hexa-1,4-diene with ethylene and propylene, Polymer, vol. 13, Issue 5, May 1972, pp. 242-244.

* cited by examiner

*Primary Examiner* — Fred M Teskin
(74) *Attorney, Agent, or Firm* — Buskop Law Group, PC; Wendy Buskop

(57) ABSTRACT

A process and the resultant product from the process for continuously making an EPDM utilizing ethylene, propylene, and dienes. This process allows for the creation of products with high diene contents and broad molecular weight distributions while utilizing a continuous flow reactor and a known catalyst. The process allows for these products to be made without gelling, or fouling of the reactor, which are problems known in the art.

16 Claims, No Drawings

SPONGE POLYMER WITH CONTROLLED LONG CHAIN BRANCHING AND BROAD MOLECULAR WEIGHT DISTRIBUTION

CROSS REFERENCE TO RELATED APPLICATIONS

The current application claims priority to and the benefit of U.S. Provisional Patent Application Ser. No. 61/711,596 filed on Oct. 9, 2012, entitled "METHOD FOR MAKING A SPONGE POLYMER." This reference is hereby incorporated in its entirety.

FIELD

The present embodiments generally relate to a unique sponge polymer composed of ethylene propylene diene monomer (EPDM) and the process for making it.

BACKGROUND

A need exists for a process to create a high performance polymer with a significant degree of long chain branching, a high degree of diene content, a unique molecular weight distribution, and favorable elasticity characteristics.

The present embodiments meet these needs.

BRIEF DESCRIPTION OF THE DRAWINGS

N/A

DETAILED DESCRIPTION OF THE EMBODIMENTS

Before explaining the polymer in detail, it is to be understood that the polymer is not limited to the particular process embodiment and that it can be created in many ways.

The present embodiments relate to a tetrapolymer boasting surprising physical and chemical characteristics as well as excellent processability. The tetrapolymer exhibits exceptional smoothness when extruded, and is suitable for use in multiple applications such as sealing and noise dampening. The tetrapolymer further exhibits excellent non-linear viscosity characteristics and compression set characteristics.

A benefit of the tetrapolymer is that the chemical components are easy to process and allow for a continuous flow process which can be operated 24 hours a day, 7 days a week, making a bright polymer with high purity.

In one or more embodiments, the process can involve blending an extender oil into the tetrapolymer.

A benefit of the process is that the resulting tetrapolymer can be reduced easily into friable bales for easy transport and delivery to a user of the polymer.

A benefit of this tetrapolymer formed by this process is that the material is easy to use in a mixer, breaking down for easy blending with other compounding ingredients.

The invention generally involves a continuous process for making a tetrapolymer utilizing ethylene, propylene, and dienes.

The process enables a person ordinarily skilled in the art to create tetrapolymers containing high diene content without reactor fouling due to gelling (or uncontrolled branching reactions). The process further allows generating product with high degrees of long chain branching, a high molecular weight, a medium breadth molecular weight distribution (MWD), a low tangent delta, and a high polyene content while making use of a known catalyst and a single reactor.

As used within this application, a diene shall refer to an organic compound containing two double bonds. Further, the diene shall be capable of being polymerized by a Ziegler-Natta catalyst.

As used within this application, the molecular weight distribution (MWD) shall refer to the weight average molecular weight of a polymer (Mw) divided by the number average molecular weight of a polymer (Mn). Mw and Mn are determined as follows:

$$M_n = \frac{\sum_i N_i M_i}{\sum_i N_i}$$

and $$M_w = \frac{\sum_i N_i M_i^2}{\sum_i N_i M_i}$$

Wherein, $N_i$ is the number of molecules having molecular weight $M_i$ in a given polymer sample.

As used within this application, the tangent delta is a measure of the relationship between viscosity and elasticity that is known to those ordinarily skilled in the art.

The descriptions below make use of norbornene derivatives as the diene for exemplary reasons. However, other dienes with similar chemical and reactive characteristics may be substituted by persons ordinarily skilled in the art.

In this process, a 5-Ethylidene-2-norbornene (ENB) can be used. In embodiments it can comprise the structure:

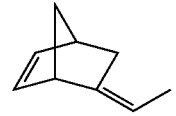

Molecular Structure:
Formula: C9H12
Molecular Weight: 120.19
Synonyms for this molecule can include: ENB; Ethylidene Norbornene; 5-Ethylene-2-Norborene; Ethylidene-2-Norbornene; 5-Ethylidene Norbornene; 5-Ethylidene-2-Norbornen; 5-Ethylidenenorborn-2-ene; 5-ethylidene-5-norbornene; Ethylidene Norbornene (ENB)
Boiling Point: 146 degrees Celsius at 760 mmHg
Flash Point: 38.3 degrees Celsius In this process, a 5-vinyl-2-norbornene (VNB) can be used which is known by the structure:

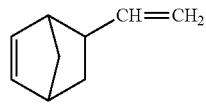

Molecular Structure:
Formula: C9H12
Molecular Weight: 120.21
Synonyms for this molecule can include: 2-Norbornene,5-vinyl-(6CI,7CI,8CI); 2-Vinyl-5-norbornene; 2-Vinylbicyclo[2.2.1]hept-5-ene; 2-Vinylnorbornene; 5-Ethenylbicyclo

[2.2.1]hept-2-ene; 5-Vinyl-2-norbornene; 5-Vinylbicyclo[2.2.1]hept-2-ene; 5-Vinylnorbornene; NSC 61529; V 0062; VBH; Vinylnorbornene Boiling Point: 141 degrees Celsius at 760 mmHg
Flash Point: 28 degrees Celsius VNB is a non-conjugated polyene with which it is known to be difficult to create copolymers due to its propensity to branch uncontrollably, create gels during polymerization, and foul a reactor. The current process allows for relatively large concentrations of VNB in tetrapolymers, and uniquely allows for terpolymers with a VNB component to be created.

The general process is described as follows:

A saturated hydrocarbon solvent is utilized as a reaction medium and carrier stream for all monomers used in the process. The saturated hydrocarbon is introduced to the reactor at a flow rate adequate to sustain a residence time of 30 minutes to 60 minutes in the reactor. Prior to entering the reactor, the saturated hydrocarbon stream is passed through a chiller to reduce its temperature below 35 degrees Celsius.

In the examples shown below, hexane is used as the hydrocarbon solvent due to its ready availability and ease of removal from the final product. However, many other hydrocarbon solvents can be utilized, such as butane, pentane, heptane, octane, and combinations thereof.

A pure ethylene monomer is introduced to the saturated hydrocarbon solvent at a flow rate to achieve the desired ethylene weight content in a final product. The ethylene content in the final product can range from 55 percent to 60 percent by weight.

A pure propylene monomer is introduced to the saturated hydrocarbon solvent at a flow rate to achieve the desired propylene weight content in a final product. The propylene content in the final product can range from 33 percent to 37 percent by weight.

The example shown below utilizes a norbornene derivative as the diene. However, similar results are to be expected with other dienes with similar chemical characteristics.

Utilizing ethylene, propylene and a diene results in an ethylene propylene diene monomer (EPDM) in the example below. EPDM is a well-known product class with desirable properties.

Hydrogen is introduced to the saturated hydrocarbon solvent at a flow rate adequate to achieve a desired molecular weight in the final product.

The dienes are introduced to the saturated hydrocarbon solvent/carrier a rate sufficient to achieve the desired weight percent in the final polymer.

The dienes can be numerous compounds as known to persons ordinarily skilled in the art. In the current example, both 5-ethylidene-2-norbornene (ENB) and 5-Vinyl-2-norbornene (VNB) are used as dienes for preparing a final product.

Some examples of other norbornene derivatives are: 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, 5-(7-octenyl)-2-norbornene.

The mixture of the saturated hydrocarbon solvent, propylene, hydrogen, and dienes is sent through a chiller to reduce its temperature below 35 degrees Celsius. As the polymerization reaction to follow is exothermic, this cooling step helps to maintain the desired temperature range within the reactor. Although the process as described is for solution polymerization, with some minor adjustments to catalyst, it can be adapted to gas, or slurry phase processes.

A Ziegler-Natta catalyst, optionally a catalyst promoter, and co-catalyst, are introduced to the reactor concurrently with the cooled mixture of the saturated hydrocarbon solvent, alpha olefin, hydrogen, and dienes.

The Ziegler-Natta catalyst comprises a transition metal, or transition metal compound. Some examples of transition metals (or compounds thereof) for the current invention are Vanadium, Titanium, and Zirconium. However, other transition metals can be substituted by persons ordinarily skilled in the art.

The Ziegler-Natta catalyst is introduced at a flow rate sufficient to sustain a continuous reaction. The example below serves to illustrate this.

The co-catalyst comprises a metal alkyl which further comprises a halogen element. The co-catalysts utilized can be Diethylaluminum chloride, Ethylaluminum sesquichloride, or Ethylaluminum dichloride.

However, many other compounds can be substituted by persons ordinarily skilled in the art.

The co-catalyst is introduced at a flow rate sufficient to sustain a continuous reaction. The example below serves to illustrate this.

The promoter comprises an oxidizing agent capable of oxidizing the transition metal and generating at least one halogen free radical per mole of promoter used. An example of a promoter is a chlorinated ester, such as Butyl-2methyl, 4,4,4-trichlorobut-2-enoate. However, many other organic compounds that generate halogen free radicals can be substituted by persons ordinarily skilled in the art.

The promoter is introduced either separately, or in solution with the Ziegler-Natta catalyst at a flow rate sufficient to sustain a continuous reaction. The example below serves to illustrate this.

The flow rate of all the above components is adjusted to allow for a residence time from 30 minutes to 60 minutes in the reactor at a temperature from 35 degrees Celsius to 65 degrees Celsius, and at a pressure of 190 pounds per square inch gauge (psig) to 230 pounds per square inch gauge (psig).

A final product is formed as a resultant tetrapolymer. The final product has a medium breadth molecular weight distribution, and a broad range of desirable characteristics that can be customized to the desired application.

This process allows for medium breadth molecular weight distribution (MWD) products, which translates to higher green strengths, improved mill handling, extremely smooth extrusion surfaces due to the relationship between viscosity and shear rate, and optimum qualities for injection molding.

At the same time, this process allows for high diene content in the final product, which translates to faster cure rates, and excellent compression set characteristics for sealing applications. Specifically, this product allows for a large VNB concentration.

This process allows for these products to be created without fouling of the reactor due to gelling, or uncontrolled branching, while utilizing only one reactor and high quantities of dienes. Specifically, high quantities of VNB can be utilized without fouling of the reactor.

The combination of medium breadth molecular weight distribution, low tangent delta, and high diene content is known in the art to be difficult to accomplish in a single reactor system without fouling of the reactor.

An embodiment of the product claimed is described below:

EXAMPLE PROCESS

In this example a tetrapolymer having high molecular weight (Mw), medium breadth molecular weight distribution (MWD), high degree of branching and high diene content is produced. The reactor is charged with hexane at a flow rate of 107 grams per minute at temperature of 45 degrees Celsius, and a reactor pressure of 200 psig.

Next, pure propylene monomer is introduced to the hexane stream at a flow rate of 19 grams per minute.

As the next step, a hydrogen in nitrogen mix with 10 percent hydrogen by weight is introduced to the hexane stream at a flow rate of 5.8 standard liters per hour.

Next, an ethylidene norbornene (ENB) monomer solution (in hexane) is introduced to the hexane stream with at a flow rate of 76 grams of solution per hour.

As the next step, a 5-vinyl-2-norbornene monomer solution (in hexane) is introduced to the hexane stream at a flow rate of 98 grams per hour.

Next, a chlorinated aluminum alkyl co-catalyst solution (ethyl aluminum sesquichloride in hexane) is fed directly to the reactor by separate stream at a rate of 78 grams of solution per hour.

Subsequently, a Ziegler-Natta catalyst solution (vanadium oxytrichloride in hexane) and a promoter solution (in hexane) are introduced to the reactor by separate stream at flow rates of 72 grams per hour each.

The Ziegler-Natta catalyst and promoter are premixed in hexane to yield a solution that is fed directly to the reactor as a single stream.

In the next step, a polymer grade ethylene monomer is incrementally introduced to the hexane stream to reach a maximum flow rate of 6.6 grams per minute.

When all reagents have been added to the reactor, the polymerization reaction is allowed to proceed with a residence time of approximately 30 minutes at a temperature of 45 degrees Celsius, and a reactor pressure of 200 psig, resulting in a tetrapolymer.

The tetrapolymer as formed has a weight average molecular weight of 476,500, a medium breadth molecular weight distribution (MWD) of 3.16, a Mooney viscosity (ML 1+4@ 125 degrees Celsius) of 82 Mooney Units (MU), and a very low Tangent Delta value of 0.692, indicative of a high level of branching.

The tetrapolymer has an ethylene:propylene ratio of 62:38, a VNB weight percent of 0.33 weight percent and ENB content of 7.3 weight percent.

While these embodiments have been described with emphasis on the embodiments, it should be understood that within the scope of the appended claims, the embodiments might be practiced other than as specifically described herein.

What is claimed is:

1. A process for continuously making tetrapolymers, comprising ethylene monomers, propylene monomers, and diene monomers, comprising:
   a. introducing a saturated hydrocarbon stream;
   b. introducing a propylene monomer to the saturated hydrocarbon stream at a rate sufficient to achieve propylene content in a final product of 32 percent to 36 percent of total weight;
   c. introducing hydrogen gas to the saturated hydrocarbon stream at a rate sufficient to control the molecular weight of the final product;
   d. introducing a first diene to the saturated hydrocarbon stream at a rate sufficient to achieve desired first diene content in the final product;
   e. introducing a second diene to the saturated hydrocarbon stream at a rate sufficient to achieve desired second diene content in the final product;
   f. introducing an ethylene monomer to the saturated hydrocarbon stream at a rate sufficient to initiate the polymerization reaction and achieve ethylene content in a final product of 53 percent to 59 percent of total weight;
   g. cooling the saturated hydrocarbon stream, the propylene monomer, hydrogen gas, the first diene, the second diene, and the ethylene monomer to below 35 degrees Celsius to create a cooled mixture;
   h. concurrently introducing a Ziegler-Natta catalyst, a co-catalyst, and optionally a promoter into a continuous flow reactor, wherein:
      (i) the Ziegler-Natta catalyst comprises a transition metal or a transition metal compound;
      (ii) the co-catalyst comprises a metal alkyl comprising a halogen element; and
      (iii) the promoter if used comprises an oxidizing agent capable of oxidizing the transition metal, and the oxidizing agent is capable of generating at least one halogen free-radical per mole of the promoter;
   i. reacting the cooled mixture, the Ziegler-Natta catalyst, the co-catalyst, the promoter if used, the first diene, and the second diene for 30 minutes to 60 minutes, at a temperature from 35 degrees Celsius to 65 degrees Celsius, and a pressure from 190 psig to 230 psig; and
   j. forming a resultant tetrapolymer as the final product.

2. The process of claim 1, wherein the Ziegler-Natta catalyst and the promoter if used are premixed before introduction to the continuous flow reactor.

3. The process of claim 1 wherein the molar ratio of the co-catalyst to the sum of the catalyst and the promoter if used is from 1 to 50.

4. The process of claim 1, wherein the saturated hydrocarbon stream is hexane.

5. The process of claim 1, wherein the first diene and the second diene are both norbornene derivatives.

6. The process of claim 1, wherein the Ziegler-Natta catalyst is a vanadium oxytrichloride or a vanadium vanadate.

7. The process of claim 1, wherein the co-catalyst is Diethylaluminum chloride, Ethylaluminum sesquichloride, or Ethylaluminum dichloride.

8. The process of claim 1, wherein the oxidizing agent is an ester comprising a halogen element.

9. The process of claim 1, wherein the oxidizing agent is Butyl-2-methyl, 4,4,4-trichlorobut-2-enoate.

10. The process of claim 1, wherein reacting the cooled mixture, the Ziegler-Natta catalyst, the co-catalyst, the promoter if used, the first diene, and the second diene occurs in a slurry phase.

11. The process of claim 1, wherein reacting the cooled mixture, the Ziegler-Natta catalyst, the co-catalyst, the promoter if used, the first diene, and the second diene occurs in a gas phase.

12. The process of claim 1, wherein reacting the cooled mixture, the Ziegler-Natta catalyst, the co-catalyst, the promoter if used, the first diene, and the second diene occurs in a solution phase.

13. A tetrapolymer made by the process of claim 1, wherein the tetrapolymer has the following characteristics:
   a. polymer chain branching as characterized by an average number of branches per polymer chain, wherein branches are from 0.02 to 0.07 branches per 1000 carbons;
   b. a weight average molecular weight of 550,000 to 635,000;
   c. a Mooney viscosity ranging from (ML 1+4@ 125 degrees Celsius) 170 to (ML 1+4@ 125 degrees Celsius) 215;
   d. an ethylene to propylene ratio ranging from 60:40 to 64:36;

e. a combined weight content of ethylene and propylene of 90 percent to 91 percent based upon the total weight of the resultant tetrapolymer;

f. a first diene content of 9 percent to 10 percent by weight content based upon the total weight of the resultant tetrapolymer; and g. a second diene content of 0.20 percent to 0.40 percent by weight content based upon the total weight of the resultant tetrapolymer.

14. A tetrapolymer having the following characteristics:

a. polymer chain branching as characterized by an average number of branches per polymer chain, wherein branches are from 0.02 to 0.07 branches per 1000 carbons;

b. a weight average molecular weight of 550,000 to 635,000;

c. a Mooney viscosity ranging from (ML 1+4@ 125 degrees Celsius) 170 to (ML 1+4@ 125 degrees Celsius) 215;

d. an ethylene to propylene ratio ranging from 60:40 to 64:36;

e. a combined weight content of ethylene and propylene of 90 percent to 91 percent based upon the total weight of the resultant tetrapolymer;

f. a first diene content of 9 percent to 10 percent by weight content based upon the total weight of the resultant tetrapolymer; and g. a second diene content of 0.20 percent to 0.40 percent by weight content based upon the total weight of the resultant tetrapolymer.

15. A thermoplastic vulcanizate comprising the tetrapolymer of claim 14.

16. The tetrapolymer of claim 14, further comprising an extender oil.

* * * * *